March 18, 1952  J. HIGGINS ET AL  2,589,381
MACHINE FOR WHIPPING CANDY BATCHES
Filed Dec. 24, 1949  2 SHEETS—SHEET 1
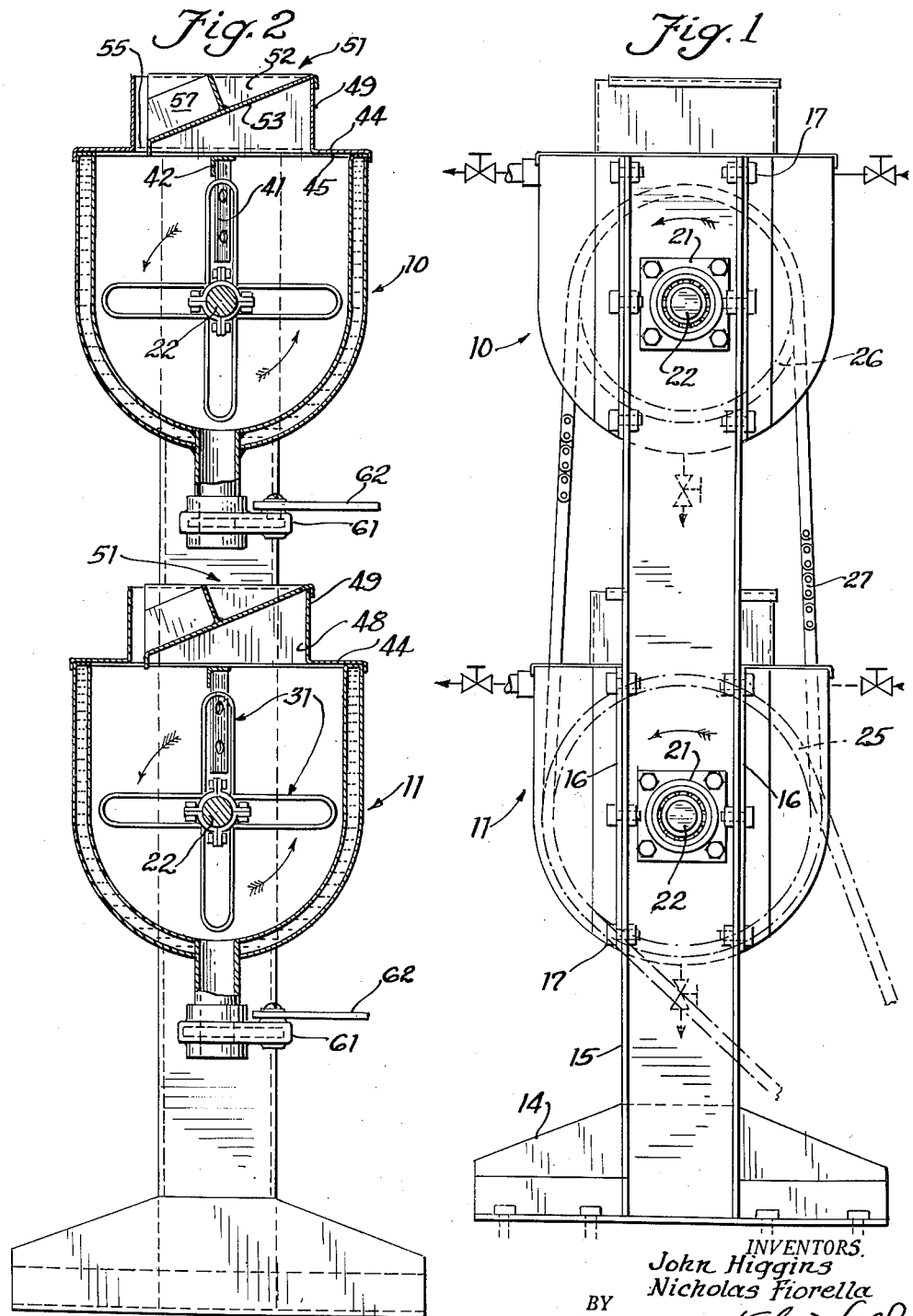
INVENTORS.
John Higgins
Nicholas Fiorella
BY
Leonard S. Kleinfeld
att'y March 18, 1952 J. HIGGINS ET AL 2,589,381
MACHINE FOR WHIPPING CANDY BATCHES
Filed Dec. 24, 1949 2 SHEETS—SHEET 2
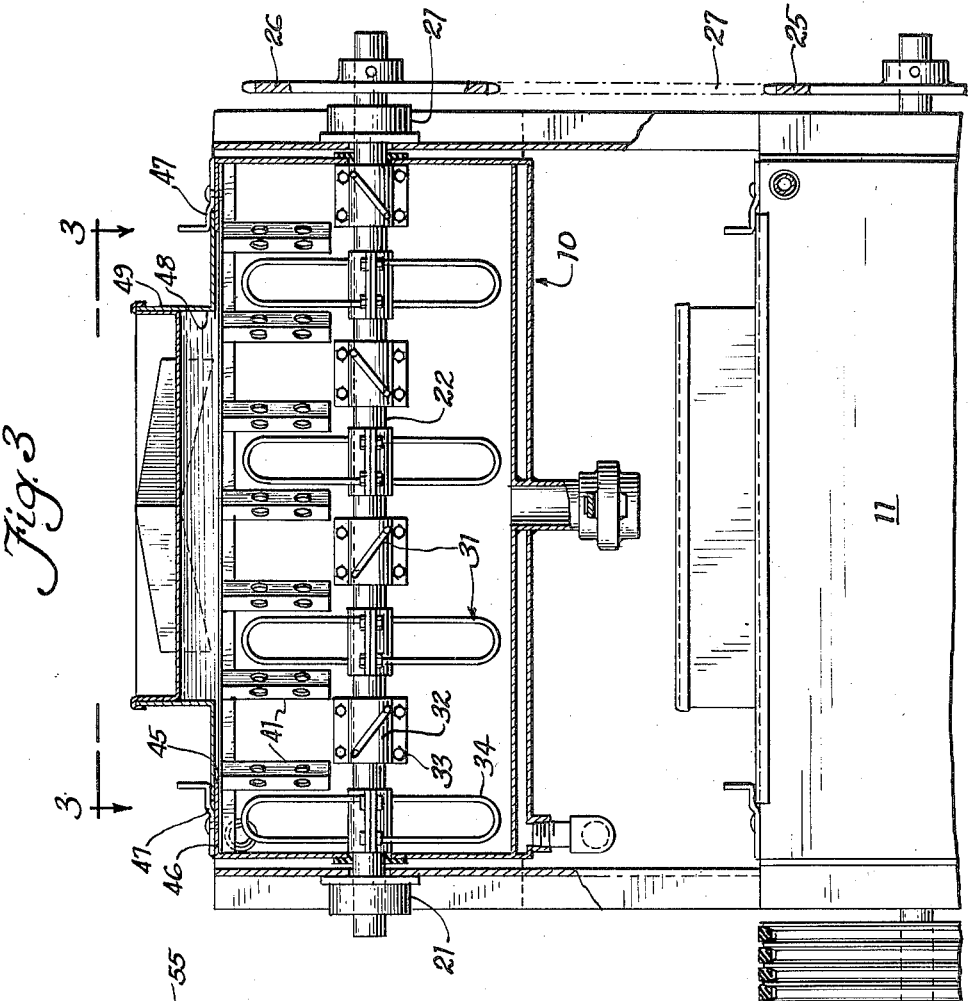
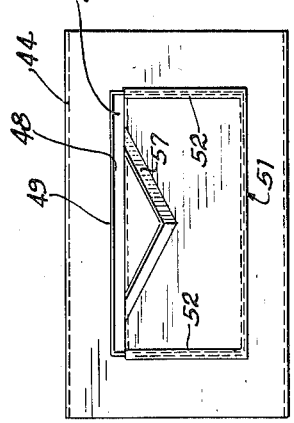
INVENTORS.
John Higgins
Nicholas Fiorella
BY
Leonard S. Kleinfeld
atty Patented Mar. 18, 1952

2,589,381

UNITED STATES PATENT OFFICE 2,589,381

MACHINE FOR WHIPPING CANDY BATCHES

John Higgins and Nicholas Fiorella, Chicago, Ill., assignors to Illini Whipper Co., a copartnership consisting of John Higgins and Nicholas Fiorella, Chicago, Ill.

Application December 24, 1949, Serial No. 134,962

2 Claims. (Cl. 259—109)

This invention relates to a whipping machine. More particularly it has reference to a machine used for whipping batches of gelatinous material from which marshmallows and other paste-like candies are made.

In the manufacture of certain types of confections it is highly important that the batch from which the finished candies are made be thoroughly aerated, but not too much so at the sacrifice of mass. That is to say, the aeration should preferably comprise minute occlusions to provide the desired lightness to the product, but without making the candy appear to be deficient in substance. As an example, marshmallows must be so characterized, otherwise their glutinous nature preponderates and renders the product unappetizing.

We are aware that many types of machines for whipping or mixing candy batches are available, but in those known to us the emphasis has been placed more on the blending and thorough admixture of the ingredients, with little or no attention having been directed to aerification. We have found that the trade regards aeration as a primary factor in the production of certain types of gelatinous candies, of which marshmallow is one produced in substantial quantities.

A primary object of the invention is the provision of a machine of the kind having a horizontally disposed beater shaft upon which a plurality of propeller like beaters are carried, the beaters being of a form capable of simultaneously blending the ingredients and imparting a desired degree of aeration thereto.

Another object resides in providing a machine capable of functioning as aforesaid, and additionally designed to convey the material from the ends of the beating receptacle whereat the raw materials are delivered to the center whereat discharge of the finished or partially processed batch is effected.

A further object is to provide a machine as aforesaid intended for two stage processing wherein a plurality of superposed units of nearly identical form are used in cascade in order to reduce the floor space occupancy of a unit of predetermined capacity, while simultaneously reducing the length of the beater shaft and the mechanical complexities attendant thereon.

Another aim is to provide a novel form of hopper for guiding the ingredients from a central point to those zones of the machine wherein the whipping operation is to begin.

Referring to the drawings which show a preferred form the invention may assume in practice:

Fig. 1 is a side elevational view of a machine embodying our invention;

Fig. 2 is a vertical cross-sectional view similar to Fig. 1;

Fig. 3 is a vertical cross-sectional view taken in a plane spaced 90° from that of Fig. 2; and Fig. 4 is a detail view in top plan and as seen in the direction of the line 3—3 of Fig. 3.

The beater or whipper forming the inventive concept may be termed a two-stage machine in that the measured ingredients are delivered to a first container for whipping for a predetermined length of time and then fed to a second container for final whipping. The transfer from one container to the other may be continuous, or the batch may be retained in the first container for a prescribed time and such batch then transferred to the second container for final processing for a further prescribed period. Such containers or vats are represented in the drawings by reference numerals 10 and 11, and are preferably of sheet metal of the configuration shown, semi-cylindrically formed at the bottom and continuing upwardly in straight sides and ends. Inasmuch as it is desirable to feed directly from the upper to the lower vat the same are preferably positioned closely adjacent, one directly above the other. Suitable support is provided by a structural iron or other form of frame comprising feet 14 and channel iron posts 15, there being parallel flanges 16—16 extending from the ends of the vats to adjoin the flanges of the posts 15, and bolts 17 are provided for uniting the same.

Inasmuch as certain mixes are best accomplished under steam-jacketing, the vats are preferably double-walled as shown, and suitable steam supply and drain valves are provided. Such jacketed vessels are so well known that elaboration of their detailed construction will be dispensed with.

Supported for rotation in ball-bearing trunnions 21—21 secured at each end of the vats 10 and 11 are the beater shafts 22—22 upon which the beaters to be described are secured for rotation. Power is supplied by an electric motor (not shown) to a multiple V-belt drive 23 secured to the lower shaft 22. Sprockets 25 and 26 keyed to the shafts 22—22 respectively, and connected by a roller chain 27 transmit power from the lower to the upper shaft. It will be noted that the upper sprocket 26 is smaller in diameter than the lower sprocket 27 to yield a higher speed for the upper beater unit, and for a purpose to appear.

One of the outstanding features of the invention resides in the construction and arrangement of the individual beater members 31, all of which are preferably identical, each comprising a split hub 32 adapted for embracing the shaft 22 and clamped thereto by bolts 33. Locked in suitable apertures in each half of the hub 32 is a U-shaped rod or beater element 34, the length of which is such as to bring the bight of the U as close as practicable to the wall of the vat to insure that all parts of the mass are subjected to the required degree of beating. The plane of the beater element 32 is preferably disposed at an angle of 45° to a plane transverse to the axis of the beater shaft and normal thereto, although it will be comprehended that such angle may be varied.

We are aware that beater paddles having a helicoidal plane are well known, and that such paddles may be perforated or imperforate. However the beater herein disclosed is characterized by being formed of a slender rod defining a fully open interior. While it might be assumed that a beater having relatively little superficial area would be of negligible effect insofar as feeding the batch from the ends of vat toward the center thereof, we have found that, contrary to such expectation, our novel form of beater is extremely efficacious in that regard. Stated otherwise, a beater element of hairpin form, as disclosed herein, is not only capable of feeding the material as just stated, but is able also to whip or beat the ingredients to an excellent consistency, including the desired aeration thereof, in far less time than is consumed in other whipping units, and with considerably reduced consumption of power.

The angular relation of the beater elements with respect to the shaft axis is so selected that feeding of the batch occurs from the ends towards the center, it being noted from Fig. 3, that of the eight individual beaters shown, four are of left handed pitch and four right handed. Moreover, it will be observed that the beater elements are arranged in diametrically opposite pairs, and that alternate pairs are displaced 90° circumferentially. Accordingly load on the shaft is properly equalized.

Breakers 41 are arranged in fixed position intermediate the beaters 31, and take the form of angle iron members extending from a rigid longitudinally disposed supporting bar 42, and positioned with the outer corner thereof directed against the direction of rotation of the beaters. Thus the mass of material, which normally tends to rotate to some extent with the beaters, is torn by the breakers and the whipping action thereby greatly accelerated.

Each of the vats 10 and 11 is provided with a loosely fitting cover 44 (Figs. 3 and 4), flanged along two sides thereof to locate the same with respect to the margins of the vat, and overlying a rectangular opening 45 in the top 46 of the vat. A pair of simple latches 47—47 are employed to lock the cover 44 in place, and to permit ready removal for cleaning of the vats.

Cover 44 is itself provided with a rectangular opening 48 bounded by an upstanding rim 49, and positioned so as to be substantially centrally of the vat longitudinally and transversely.

Loosely supported, for convenience of removal and cleaning, on the rim 49 is the hopper structure 51 including two triangular ends 52 and an inclined floor 53, such ends and floor at their upper edges being folded to fit removably over the rim 49. It will be noted from Figs. 2 and 4 that the floor 53 terminates short of the rear side of the rim 49 to define a slot 55 through which the raw materials are delivered to the downwardly moving beaters 31.

In order to direct the ingredients toward the ends of the vat there is secured to the floor 53 of the hopper 51 a V-shaped diverter 57. Accordingly if the raw materials are deposited substantially at the center of the hopper the batch will be subdivided, substantially one-half proceeding to one end, and the remainder to the other end, thus making for uniformity of mixing and a properly distributed load on the beater shafts.

By virtue of the smaller sprocket 26 the upper assembly of beaters is rotated approximately 50 R. P. M. faster than the lower assembly in order that the ingredients being preliminarily whipped in the upper vat are dispatched to the center thereof at a higher rate of speed than the material in the lower vat is being discharged. Thus the lower vat is never able to outrun the upper vat and thereby run idle. It will be understood that in connection with the preceding considerations a continuous process is assumed to be occurring, the raw materials being supplied to the upper vat substantially continuously, and the finished batch being similarly removed from the lower vat.

To effectuate the last noted object each vat is provided with a gate or other valve 61 arranged for rapid opening and closing, as by a lever 62. If desired the flow may be interrupted by suitable manipulation of either or both of such valves.

From the foregoing description it will have become clear that we have provided a compact, simple and efficient machine for continuously preparing candy or similar material in whipped form. The machine has been found to yield a substantial saving of power while producing a material of a consistency far superior to that familiar to this art. By providing the open beaters the material is subjected to the necessary degree of agitation with the elimination of the relatively high resistance to movement of the solid paddles heretofore employed, and, furthermore, without sacrifice of the helicoidal feeding action desirable in equipment of this type.

While we have shown a particular embodiment of our invention, it will be understood, of course, that we do not wish to be limited thereto since many modifications may be made, and we therefore contemplate by the appended claims to cover any such modifications as fall within the true spirit and scope of our invention.

We claim:

1. A batch whipper for the purpose described, comprising a receptacle, a beater shaft journaled in the walls of the receptacle for rotation relatively thereto, and a plurality of beaters secured to said shaft, each said beater comprising a rod of U-form having parallel legs secured at their ends to the shaft and defining an open-centered structure, a removable cover for said receptacle, and a plurality of fixed batch-breaking members each positioned intermediate adjacent beaters and suspended from said cover.

2. A batch whipper for the purpose described comprising a receptacle, a beater shaft journaled in the walls of the receptacle for rotation relatively thereto, and a plurality of groups of pairs of radially extending beaters secured to said shaft, the members of each pair being radially opposite, and alternate pairs being respectively positioned ninety degrees apart about the shaft, a removable cover for said receptacle, and a plurality of fixed batch-breaking members each positioned intermediate adjacent beaters and suspended from said cover.

JOHN HIGGINS.
NICHOLAS FIORELLA.

REFERENCES CITED

The following references are of record in the file of this patent:

UNITED STATES PATENTS

| Number | Name | Date |
|---|---|---|
| 228,641 | Janssen et al. | June 8, 1880 |
| 254,540 | Deis | Mar. 7, 1882 |
| 810,417 | Kadel | Jan. 23, 1906 |
| 872,610 | Cunningham et al. | Dec. 3, 1907 |
| 1,461,936 | Richards | July 17, 1923 |
| 1,740,302 | Hodges et al. | Dec. 17, 1929 |
| 1,871,416 | Broadfield | Aug. 9, 1932 |
| 2,205,814 | Forster | June 25, 1940 |

FOREIGN PATENTS

| Number | Country | Date |
|---|---|---|
| 102,446 | Germany | Apr. 24, 1899 |